United States Patent [19]

Strong

[11] Patent Number: 5,497,846
[45] Date of Patent: Mar. 12, 1996

[54] HAND SUPPORT FOR TRACTOR CONTROLS

[75] Inventor: Russell W. Strong, Craftsbury, Vt.

[73] Assignee: New Holland North America, Inc., New Holland, Pa.

[21] Appl. No.: 321,289

[22] Filed: Oct. 11, 1994

[51] Int. Cl.⁶ .................................................. B60K 26/00
[52] U.S. Cl. ............................................ 180/315; 296/71
[58] Field of Search ................................... 180/315, 320; 296/70, 71, 74

[56] References Cited

U.S. PATENT DOCUMENTS 4,200,166  4/1980  Hansen ...................................... 180/315

FOREIGN PATENT DOCUMENTS 15231  1/1985  Japan ........................................ 296/71
213103  8/1993  Japan ........................................ 296/71

OTHER PUBLICATIONS

J. C. Whitney Catalog No. 551J, Feb. 1993, p. 118, item no. 12–3451Y (Interior Handle.

*Primary Examiner*—Kenneth R. Rice
*Attorney, Agent, or Firm*—Larry W. Miller; Frank A. Seemar

[57] ABSTRACT

A face plate to be affixed to the interior of the operator's cab of an agricultural tractor around the electronic control devices within the reach of the operator is disclosed wherein the face plate is provided with an outwardly projecting hand brace affixed to the face plate. The face plate is mounted around the electronic device such that the hand brace is positioned below the electronically controlled device to provide a brace against which the operator's hand can be steadied to permit the manipulation of the control device while the tractor is operating through uneven terrain. By resting the hand against the hand brace the fingers can be steadied sufficiently to allow the electronic controls to be properly manipulated, irrespective of the unevenness of the terrain over which the tractor is traversing.

10 Claims, 5 Drawing Sheets

HAND SUPPORT FOR TRACTOR CONTROLS

BACKGROUND OF THE INVENTION

This invention relates generally to off-road motor vehicles, such as tractors, and more particularly, to a device for bracing the operator's hand when manipulating electronic controls in the operator's cab of the tractor.

Off-road vehicle manufacturers, including the manufacturers of agricultural tractors, are utilizing electronically controlled equipment, such as radios, communication equipment and other small electronic control devices that require a steady hand to effect operation thereof. Off-road equipment, particularly agricultural tractors, do not provide a steady work environment while the vehicle is in its normal operation to facilitate the steady control of the operator's hand as the operator attempts to manipulate these small electronic controls.

Accordingly, it would be desirable to provide a hand brace associated with any such electronic controls to allow the operator's hand to be steadied while the vehicle is oscillating in it's normal operation.

SUMMARY OF THE INVENTION

It is an object of this invention to overcome the aforementioned disadvantages of the prior art by providing a hand brace to built into the operator's cab structure adjacent appropriate electronic controls to allow the operator's hand to be steadied during the operation of the vehicle to allow the desired manipulation of the electronic control.

It is another object of this invention to provide a face plate for the corresponding electronically controlled device having a hand brace incorporated therein to be mounted adjacent the electronically controlled device.

It is a feature of this invention that the hand brace projects outwardly below the electronically controlled device to allow the operator's hand to rest thereon for manipulation of the controls.

It is an advantage of this invention that the operator can accurately manipulate the electronic controls while the tractor is operating.

It is another feature of this invention that the face plate incorporating the hand brace can be selectively added to the interior of the operator's cab to provide appropriate support adjacent the desired control mechanism.

It is still another object of this invention to provide a face plate incorporating a hand brace to be affixed to the interior of the operator's cab of an agricultural tractor which is durable in construction, inexpensive of manufacture, carefree of maintenance, facile in assemblage, and simple and effective in use.

These and other objects, features and advantages are accomplished according to the instant invention by providing a face plate to be affixed to the interior of the operator's cab of an agricultural tractor around the electronic control devices within the reach of the operator is disclosed wherein the face plate is provided with an outwardly projecting hand brace affixed to the face plate. The face plate is mounted around the electronic device such that the hand brace is positioned below the electronically controlled device to provide a brace against which the operator's hand can be steadied to permit the manipulation of the control device while the tractor is operating through uneven terrain. By resting the hand against the hand brace the fingers can be steadied sufficiently to allow the electronic controls to be properly manipulated, irrespective of the unevenness of the terrain over which the tractor is traversing.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
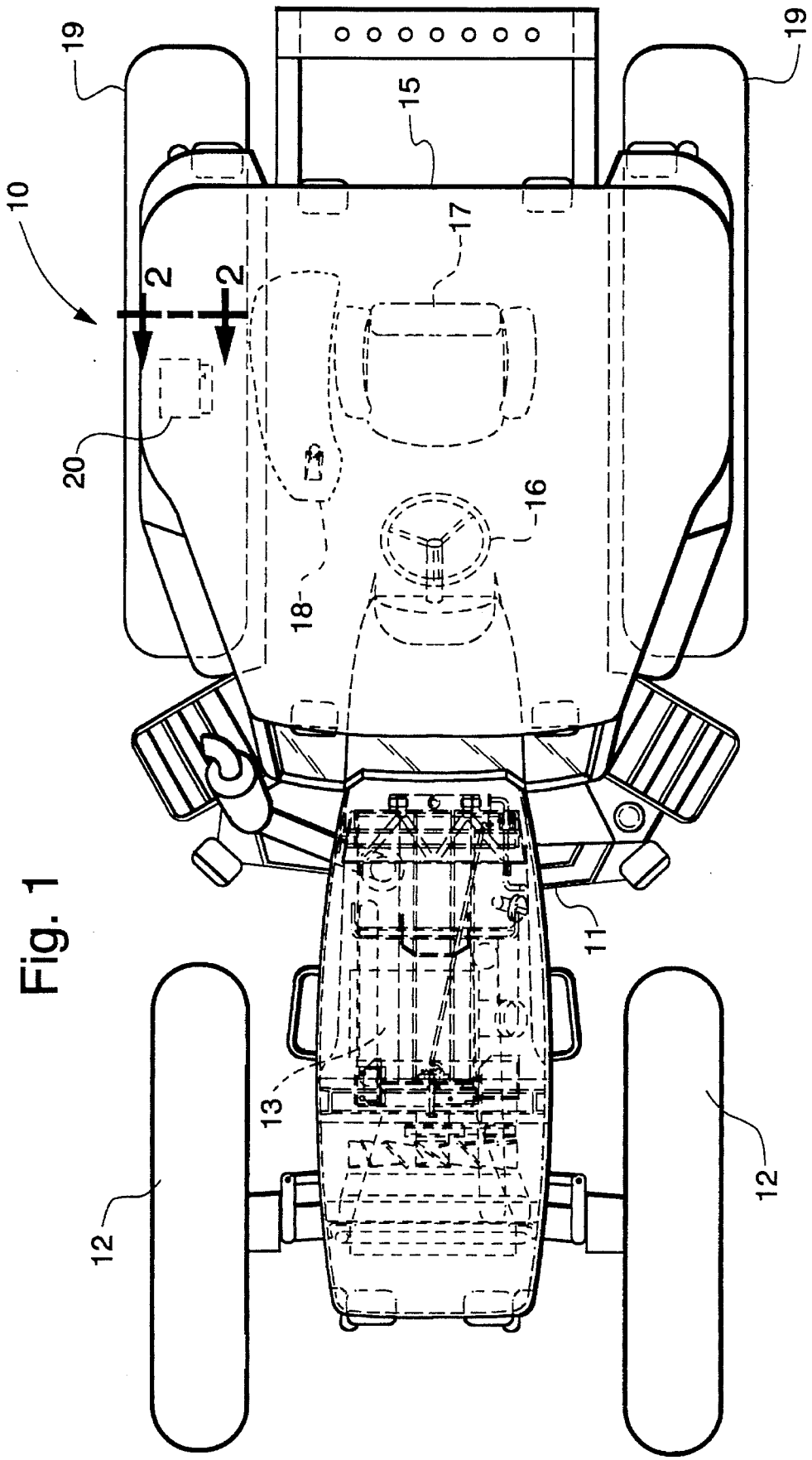
FIG. 1 is a top plan view of a tractor incorporating the principles of the instant invention, the operator's seat, steering wheel, control console, radio, and engine being shown in phantom.

Referring now to the drawings and, particularly, to FIG. 1, a representative view of an agricultural tractor incorporating the principles of the instant invention can best be seen. Left and right references are used as a matter of convenience and are determined by standing at the rear of the tractor and facing the forward end in the normal direction of travel. The tractor 10 includes a chassis 11 supported above the ground in a conventional manner by forward steerable wheels 12 and rearward drive wheels 19 rotatably mounted in a customary transversely spaced orientation and houses a conventional engine 13 serving to provide operational power for the tractor 10 and an operator's cab 15 positioned in an elevated location. The operator's cab 15 includes a steering wheel 16, positioned forwardly of the conventional operator's seat 17, to operate the steering of the front wheels 12 in a known manner. A control console 18 is positioned to the right of the operator's seat 17 for access by the operator's right hand, as is conventional.

Figure 2:
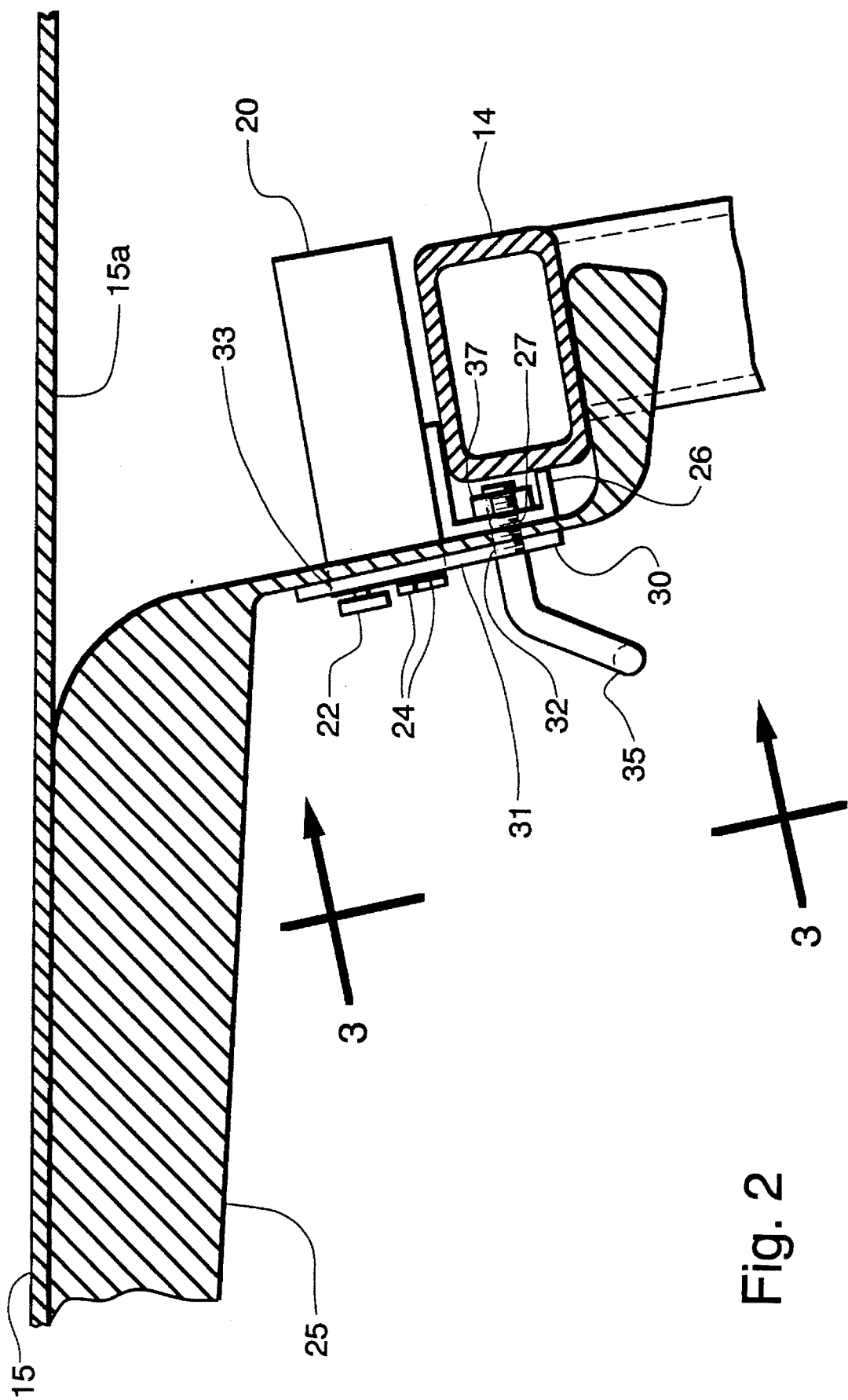
FIG. 2 is an enlarged partial cross-sectional view of the operator's cab taken along lines 2—2 of FIG. 1 to show a left side elevational view of the face plate attached to the head liner of the cab to encircle a control apparatus representatively depicted as a radio positioned above the operator's seat adjacent the roof of the operator's cab.
Figure 3:
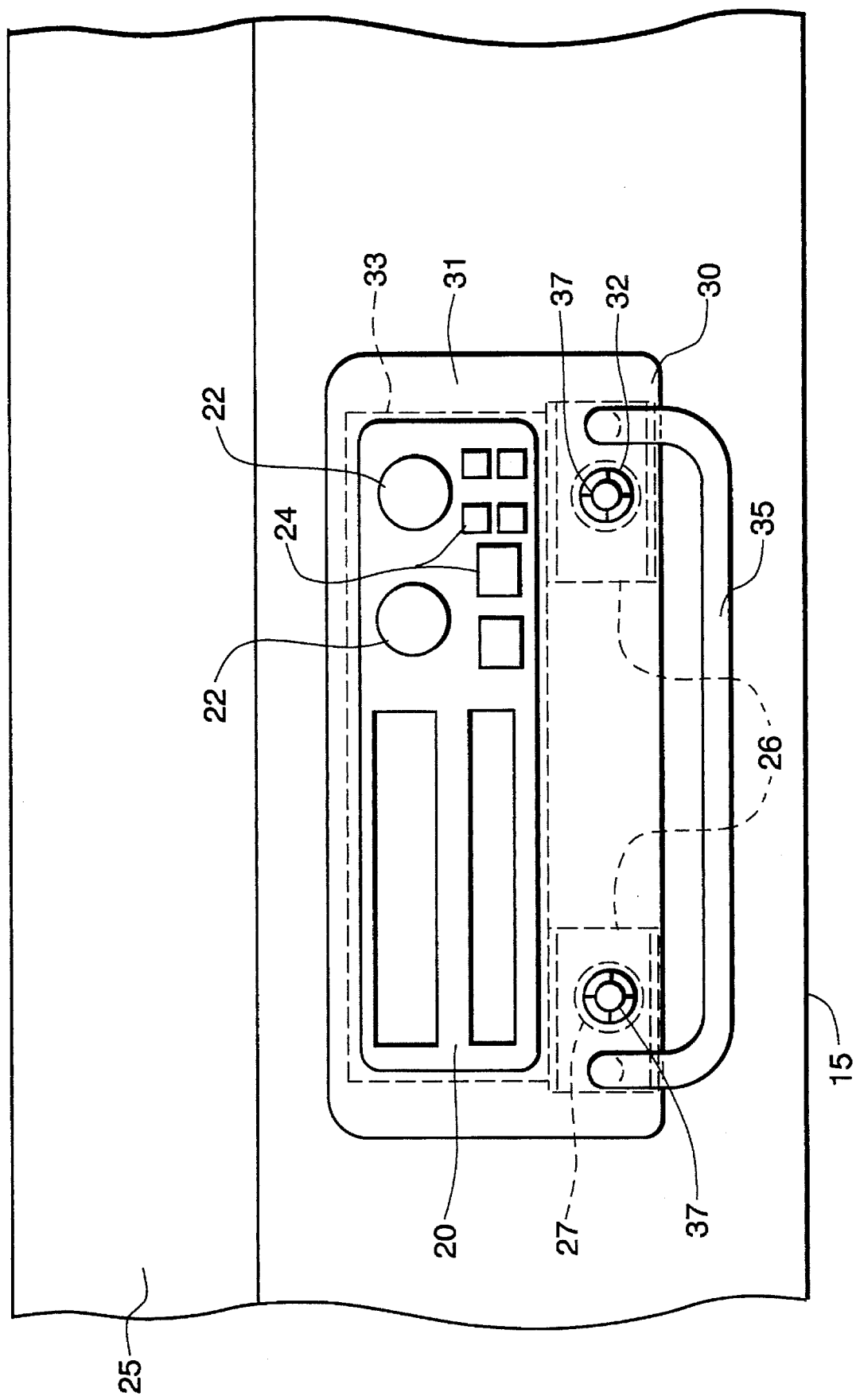
FIG. 3 is an elevational view of the face plate corresponding to lines 3—3 of FIG. 2.
Figure 4:
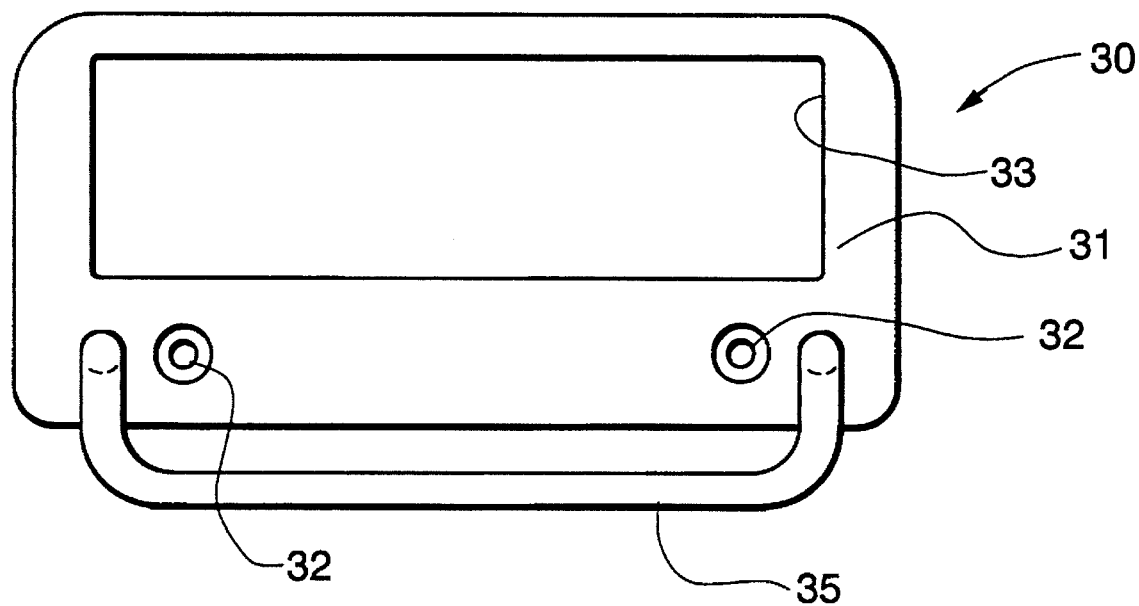
FIG. 4 is a front elevational view of the face plate.
Figure 5:
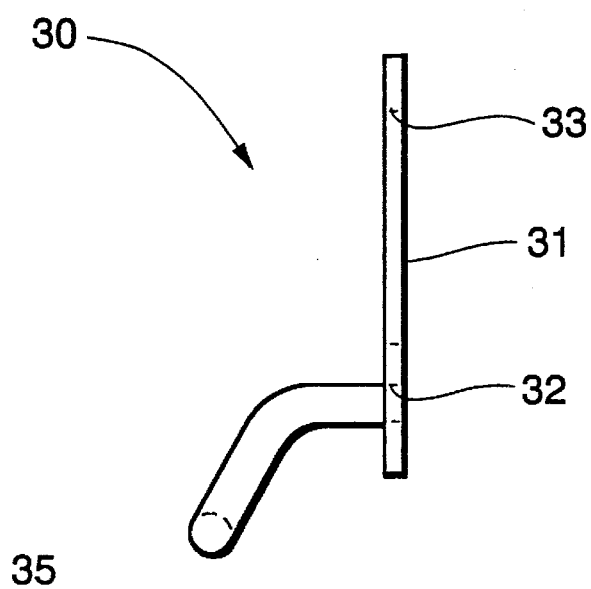
FIG. 5 is a left side elevational view of the face plate.
Figure 6:
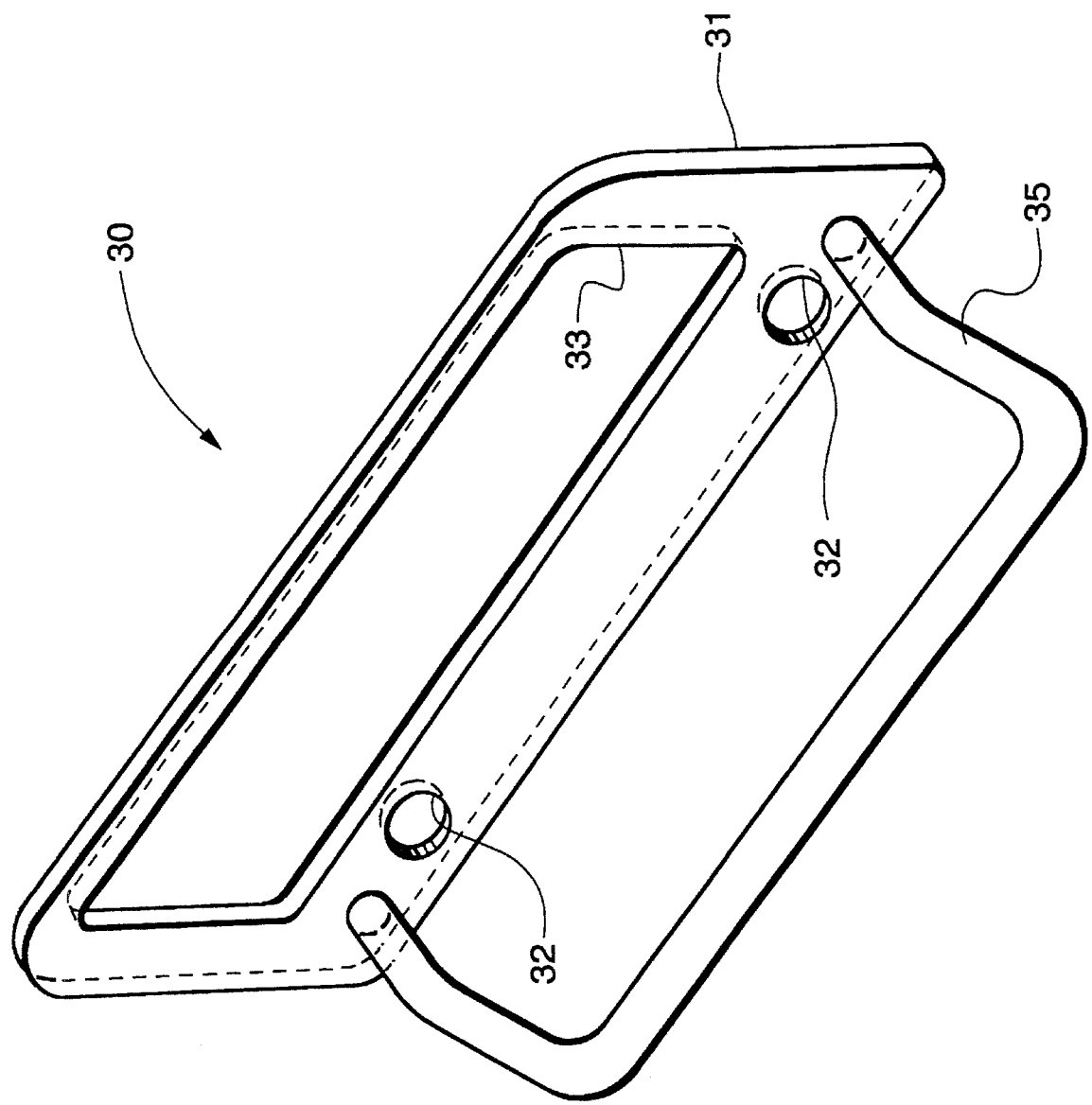
FIG. 6 is a perspective view of the face plate taken from an upper, left side perspective.

As can be seen best in FIGS. 2 and 3, and as will be recognized by one of ordinary skill in the art, the operator's cab 15 includes a number of devices, such as representatively shown by the radio 20, that are typically controlled electronically through control knobs 22 or control push buttons 24. Even if the device is not strictly electronic in nature, the manipulation of the controls 22, 24 usually requires a relatively steady hand to effect proper operation thereof. Since tractors 10 are typically operated over uneven terrain, such as unplowed fields, the tractor 10 will normally suffer significant vertical undulations while operating that prevent the operator from having a steady hand to allow proper manipulation of the controls 22, 24.

The operator's cab 15 is usually provided with a head liner 25 affixed to the cab frame 14 and the roof 15a of the cab 15 in a conventional manner. A pair of spaced-apart mounting supports 26 are affixed to the cab frame 14 and is positioned behind the headliner 25 adjacent to the radio 20. Each mounting support 26 includes a threaded opening 27. The face plate 30 includes a body portion 31 formed with a pair holes 32 therein in a spaced relationship to correspond to the threaded openings 27 in the mounting supports 26. The body portion 31 can be of any suitable shape or configuration, but is preferably generally rectangular and is provided with a central opening 33 through which the radio 20 or other control can be positioned. Accordingly, the face plate 30 surrounds the radio 20 to provide a finished look thereto.

As seen best in FIGS. 2–6, the face plate 30 also includes a hand brace 35 affixed to the body portion 31 to be integral therewith. The hand brace 35 projects outwardly from the body portion 31 away from the head liner 25 and away from the radio 20. The hand brace 35 can also be of any suitable shape or configuration, but is preferably rounded in cross-section so as not to present an edge to the operator and forms a loop that is fastened at each end to the body portion 31 and is otherwise spaced away from the body portion 31 to provide the function described in greater detail below.

To manipulate the controls 22, 24 while the tractor 10 is moving across uneven terrain, causing the tractor to bounce somewhat over the undulations in the ground, the operator need only rest his hand on the hand brace 35 to steady his hand sufficiently to use his fingers to manipulate the controls 22, 24. Accordingly, the hand brace 35 needs to be spaced outwardly from the body portion 31 of the face plate 30 as sufficient distance to allow the operator's hand to be rested thereon while permitting the fingers to reach comfortably and manipulate the controls 22, 24.

The face plate 30 is detachably mounted to the mounting support 26 by fasteners 37 extending through the holes 32 in the body portion 31 and being threadably received within the threaded openings 27 in the mounting supports 26. The fasteners 37 hold the face plate 30 in position against the head liner 25 to provide the desired finished look. The radio 20 can be slid through the central opening 33 in the body portion 31 to be supported in a conventional manner by the cab frame 14 without requiring the removal of the face plate 30. Alternatively, the radio 20 could be mounted behind the face plate 30, which would require the removal of the face plate 30 to facilitate the mounting or removal of the radio 20, if needed, simply by removing the fasteners 37.

One skilled in the art will readily realize that the face plate 30 and integral hand brace 35 are not limited in use to radios 20. The provision of a hand brace 35 in association with any number of controls requiring a steady hand for proper and effective manipulation thereof can be provided by the installation of a face plate 30 configured in an appropriate size and shape to correspond to the controls to be manipulated. Furthermore, the face plate 30 need not encircle the control device and may only consist of a small body portion 31 sufficient in size to provide an adequate support of the hand brace 35 beneath the controls to be manipulated. The provision of a face plate 30 separate from the controlled device, such as the radio 20, allows standard controlled devices to be utilized in the construction of the operator's cab 15, while the face plate 30 and integral hand brace 35 can be added to the interior of the cab 15 separately.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a tractor having a wheeled chassis adapted for movement over the ground; an engine supported on said chassis for providing operative power for said tractor; and an operator's station supported on said chassis and containing controls for controlling selected operative functions, at least one of said controls having movable control devices to be manipulated in a predetermined manner to control the corresponding operative function, the improvement comprising:

bracing means formed as a loop mounted on said operator's station adjacent to, yet spaced outwardly from, said at least one control to provide a hand rest for the steady operation of said movable control devices.

2. The tractor of claim 1 wherein said bracing means includes a face plate comprising:

a body portion detachably connectable to said operator's station; and said loop portion extending outwardly from said body portion in spaced relationship to said movable control devices.

3. The tractor of claim 2 wherein said body portion includes an opening formed therein, said body portion encircling said at least one control such that said movable control devices are accessible through said opening.

4. The tractor of claim 3 wherein said loop is positioned below said opening.

5. The tractor of claim 4 wherein said body portion is detachably connect by fasteners threadably engaged with a mounting member.

6. In a tractor having a wheeled chassis adapted for movement over the ground; an engine supported on said chassis for providing operative power for said tractor; an operator's cab supported on said chassis and having an interior surface; and control mechanisms for controlling selected operative functions, at least one of said control mechanisms having movable control devices to be manipulated in a predetermined manner to control an operative function of said tractor, the improvement comprising: a face plate detachably affixed to said operator's cab adjacent said at least one control mechanism, said face plate including:

a body portion mounted adjacent to said at least one control mechanism; and a hand brace affixed to said body portion and extending outwardly thereof to define a hand rest spaced outwardly from said body portion.

7. The tractor of claim 6 wherein said hand brace is positioned below said central opening.

8. The tractor of claim 7 wherein said body portion is detachably connected to a mounting member positioned behind a head liner defining an interior surface of said operator's cab by threaded fasteners.

9. The tractor of claim 8 wherein said body portion has a central opening formed therein, said control devices being accessible through said central opening.

10. The tractor of claim 9 wherein said control devices control the operation of a radio mounted in said operator's cab.

\* \* \* \* \*